United States Patent [19]

Joyner

[11] Patent Number: 4,989,362
[45] Date of Patent: Feb. 5, 1991

[54] CRICKET DISPENSING AND HOOKING DEVICE

[76] Inventor: Ronald D. Joyner, 7821 Coronet La., Pensacola, Fla. 32514

[21] Appl. No.: 361,992

[22] Filed: Jun. 5, 1989

[51] Int. Cl.⁵ .......................................... A01K 97/04
[52] U.S. Cl. ...................................................... 43/55
[58] Field of Search ................... 43/55, 54.1; 221/288, 221/194, 306 AM, 309, 115, 117

[56] References Cited

U.S. PATENT DOCUMENTS

| | | | |
|---|---|---|---|
| 2,846,807 | 8/1958 | Tucker | 43/55 |
| 3,308,570 | 3/1967 | Horton | 43/55 |
| 4,030,226 | 6/1977 | Shelton et al. | 43/55 |
| 4,110,931 | 9/1978 | Maness | 43/55 |
| 4,825,577 | 5/1989 | Brannon | 43/55 |

Primary Examiner—Richard K. Seidel
Assistant Examiner—James Miner

[57] ABSTRACT

The invention discloses a live bait dispenser for receiving and retaining a plurality of crickers or other like fish bait and comprising devices to allow for the transfer of said bait to a container from which they cannot return and also a means by which the operator may hook said bait and remove it from the device without allowing other baits to escape.

1 Claim, 4 Drawing Sheets

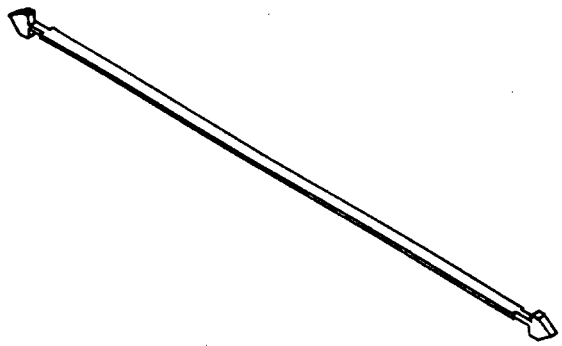
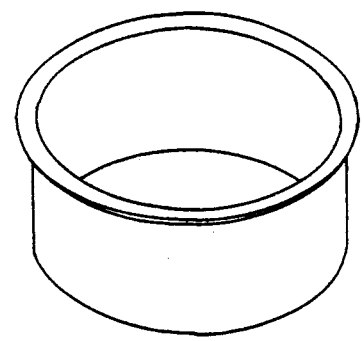
FIGURE 1
FIGURE 2
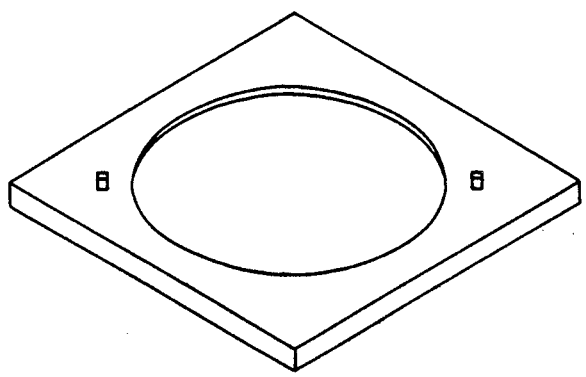
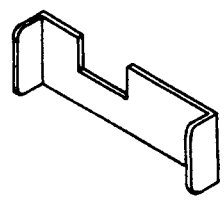
FIGURE 3
FIGURE 4

CRICKET DISPENSING AND HOOKING DEVICE

BACKGROUND OF THE INVENTION

The present invention relates to devices which are employed for the purpose of retaining crickets (or other like fish bait hereinafter referred to as a cricket) for the purpose of placing them on a fishing hook and using them as fish bait.

Previously manufactured devices for this purpose would require the operator of the device to reach into the device and proceed to attempt to catch one cricket. Upon successful completion of this task, the operator would then attempt to hold the cricket in one hand in a position that would enable him to mount the cricket onto a fishing hook with his remaining hand. Such tasks often proved unsuccessful for two major reasons. The operator would catch more than one cricket at a time when reaching into the device. This would require the operator to attempt the release of all but one of the crickets and successfully return them into the device. The other reason is the operator is often unable to place a cricket into a position so that it may be mounted onto a fishing hook without the cricket jumping free from the operator's grasp.

A search of the prior art uncovered the following U.S. Pat. Nos. directed to this art: 4,030,226; 4,110,931; 4,207,993 and 4,825,577.

An entirely satisfactory means of both catching a single cricket and retaining him in a position to be mounted onto a fishing hook has not been available until the emergence of this invention.

SUMMARY OF THE INVENTION

The present invention is concerned with both the means of placing a cricket in a position from which it cannot successfully escape and also providing a means for mounting the cricket onto a fishing hook.

An object of this invention is to provide a device that will selectively allow crickets to enter from a larger retaining area and be prevented from returning.

Still another object of this invention is to provide a device that will hold the cricket in a stationary position from which it cannot escape.

Still another object of this invention is to provide a device that will allow the operator to mount the cricket onto a fishing hook without the need of the operator to hold the cricket.

A still further object of this invention is to provide a means of removing the mounted cricket from the device without allowing other crickets to escape from the device.

These claims are illustrated in the accompanying drawings, which, by way of illustration, show a preferred embodiment of the present invention and the principles thereof, and what is considered to be the best mode in which to apply these principles. Other and different embodiments of the invention embodying the same or equivalent principles may be used and structural changes may be made as desired by those skilled in the art without departing from the invention.

BRIEF DESCRIPTION OF THE DRAWINGS

Eleven drawings accompany this application.

FIGS. 1 through 10 are isometric views at ½ scale of each of the items of the invention. The view names (e.g. FIG. 4) corresponds to the items as labeled in drawing #1.

DETAILED DESCRIPTION

The invention is composed of 10 items.

Item "1" is the handle by which the invention is carried and is made of a flexible nylon material.

Item "2" is a nylon collar approximately 4" in diameter.

Item "3" is the top of the cricket box. It is made of a hard plastic material and is approximately 5"×5". It has a hole in the middle to accommodate item "2" and two slots to accommodate item "1".

Item "4" is made of a hard plastic material and measures approximately 1"×3". Its purpose is to act as a barrier between the cricket box and item "6".

Item "5" acts as one of the four sides of the cricket box and is made of a hard plastic. It has a hole near the top center of the item which acts as the doorway between the cricket box and item "6". It also has a raised area on the outside to act as a "seat" for items "6" & "7". The side of item "5" that faces the inside of the cricket box has a textured surface. It also has a hole near the bottom to accommodate item "8".

Figure 5:
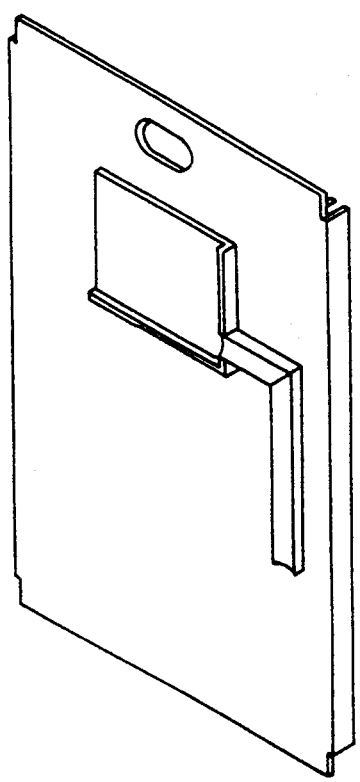
Figure 6:
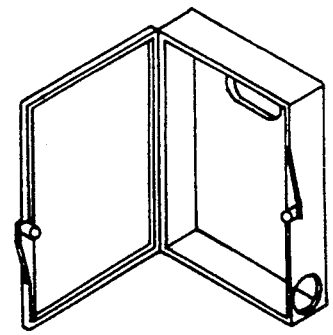
Figure 7:
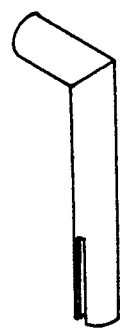
Figure 8:
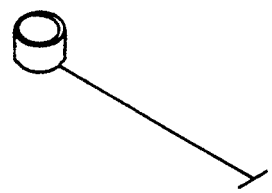
Figure 9:
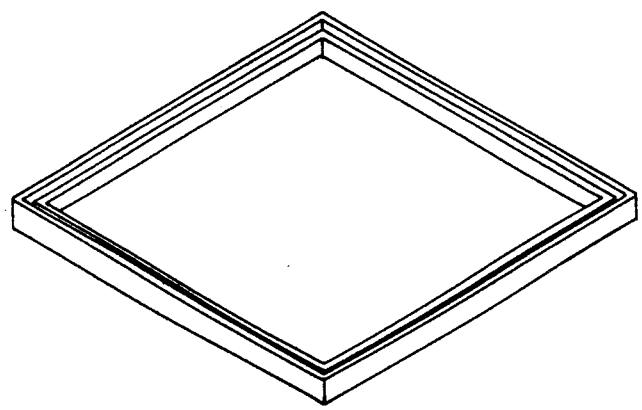
Figure 10:
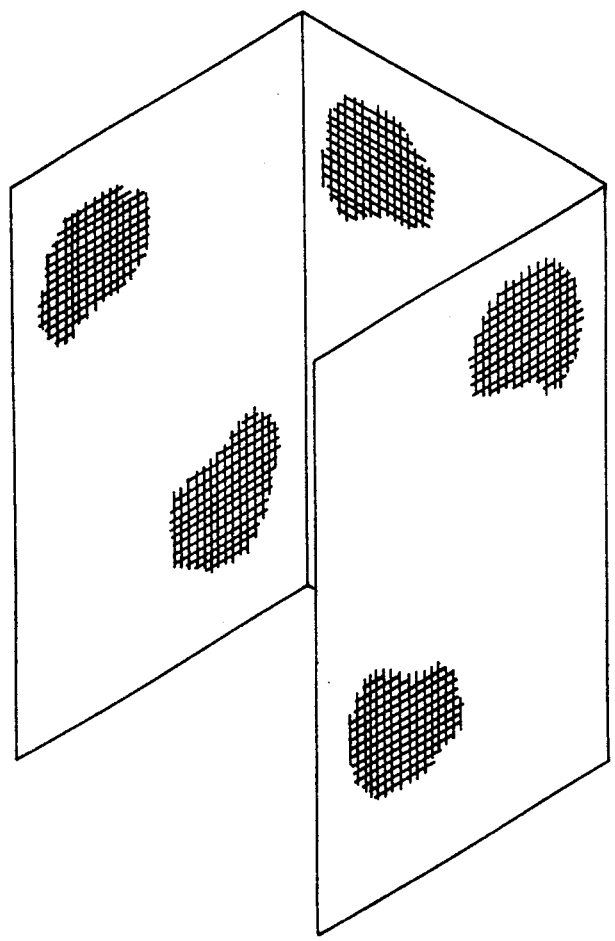
Figure 11:
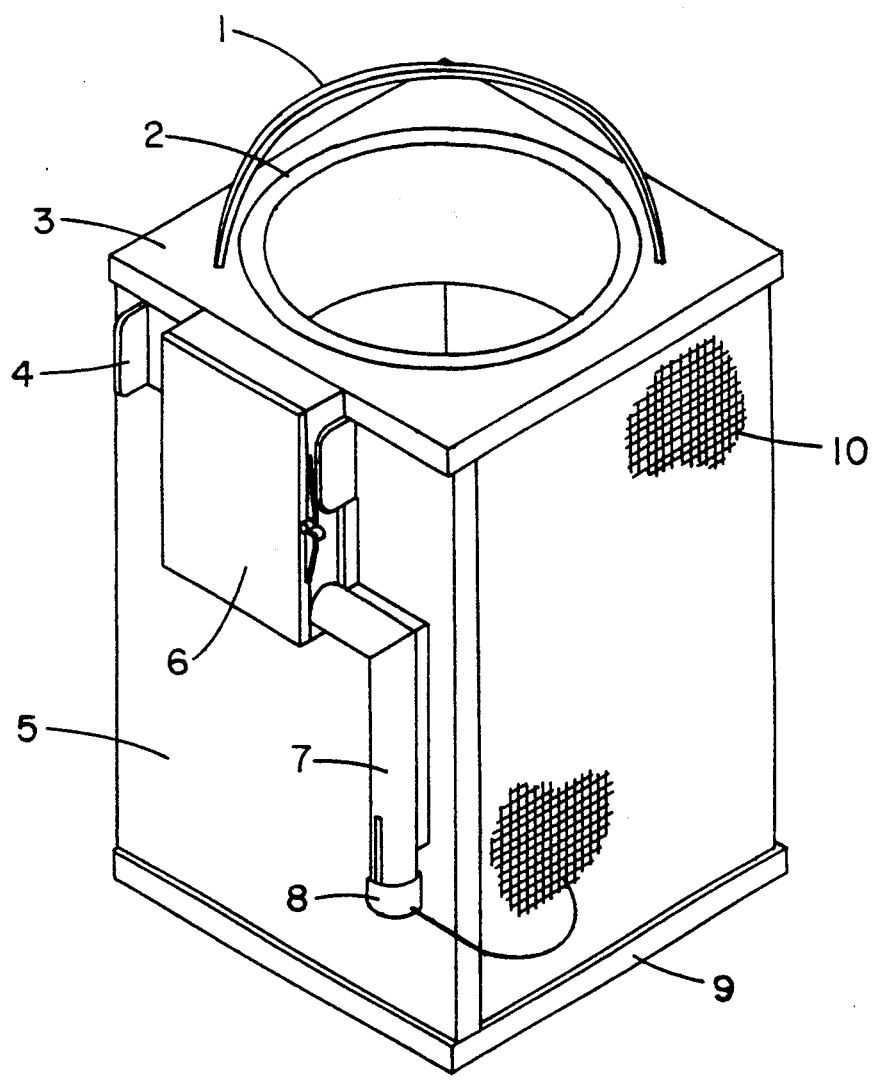
FIG. 11 is an isometric view of the assembled invention at ½ scale, and labels each item that comprises the invention.

Item "6" is a clear plastic box measuring approximately 3"×2"×½". It has a lid which is shown in the open position in FIG. 6 on drawing #3. It also has a hole in the rear which matches with the hole on item "5". It also has a hole on the side near the bottom where it connects with item "7".

Item "7" is a clear plastic tube measuring approximately ¼" in diameter. The horizontal section of the tube connects to item "6" and the vertical section has a slot though the wall of the tube that extends from the bottom for a distance of approximately 1".

Item "8" is made of flexible nylon. It is a cap to cover the end of item "7" and has a thin nylon string to allow it to be attached to item "5".

Item "9" is the bottom of the cricket box. It is made of a hard plastic and measures approximately 5"×5".

Item "10" is made of a wire mesh. is serves as the three remaining sides of the cricket box and fits into grooves on the edges of items "3", "5" & "9".

It should now be apparent that crickets may be placed into the invention through the collar (item "2"). The crickets may then climb along the interior of the device because item "10" is made of wire mesh and the interior of item 37 5" has a textured surface. Then, at the discretion of the operator, item "4" may be moved to provide the crickets with an escape from the space bounded by items "3", "5", "9" and "10". The cricket will now be in the interior of item "6". Due to the smooth interior of item "6", the cricket cannot return to the previously occupied space. It will now proceed through the horizontal section of item "7" and fall down the vertical section of this item and be stopped by item "8". The smooth interior surface of item "7" will prevent the cricket from moving from this position. The operator may now place a hook through the slot in the side of item "7" and mount the cricket onto the hook. The operator may then remove item "8" from the end of item "7", remove the mounted cricket, and replace item "8" over the end of item "7" to prevent other crickets from exiting.

Thus, while a preferred embodiment of the invention has been illustrated herein, it is to be understood that changes and variations may be made by those skilled in the art without departing from the spirit and scope of appending claims.

I claim:

1. A live bait dispenser, comprising:

a container equipped for receiving and retaining a plurality of crickets or other live fish bait with a rough surface on one or more of the interior surfaces of said container allowing bait to crawl from the bottom to the top of said container, and also equipped with at least one hole by which bait may exit said container and enter a detention box;

a sliding door which will block and unblock the opening between the container and the detention box and can be operated by the user of the dispenser by sliding it back and forth;

at least one detention box attached to the outside of said container, said detention box being smooth on all interior surfaces and equipped with a hole allowing bait to enter from aforementioned container and also equipped with a hole by which bait may exit said detention box;

at least one conduit having a smooth interior surface attached to said detention box at said exit hole in a horizontal position which, after traversing in a horizontal position, makes a 90 degree bend to a vertical position and extends downward to an opening which is closed off with a removable cap, said vertical section having a slot through the side which will allow a hook to be placed through said slot to impale bait;

a removable cap placed on the end of said conduit to prevent bait from exiting said conduit and when removed will allow bait to be removed from said conduit.

* * * * *